(No Model.)
A. T. BOOTH.
TURNING MACHINE.
No. 300,943. Patented June 24, 1884.
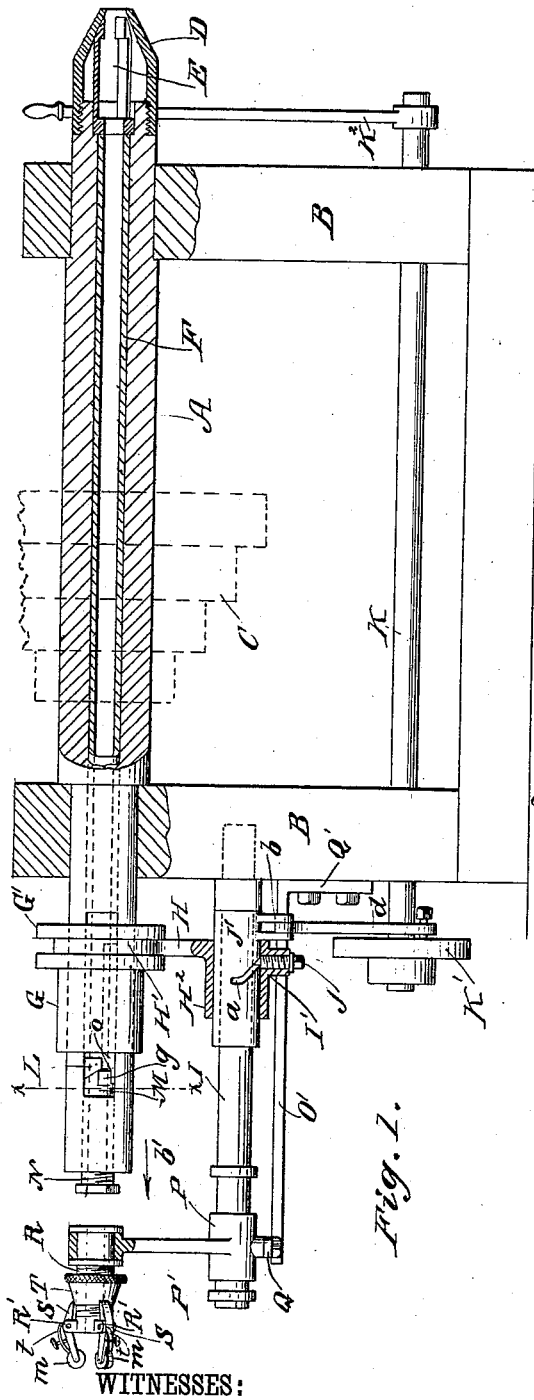
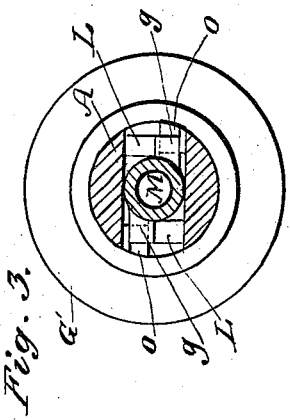
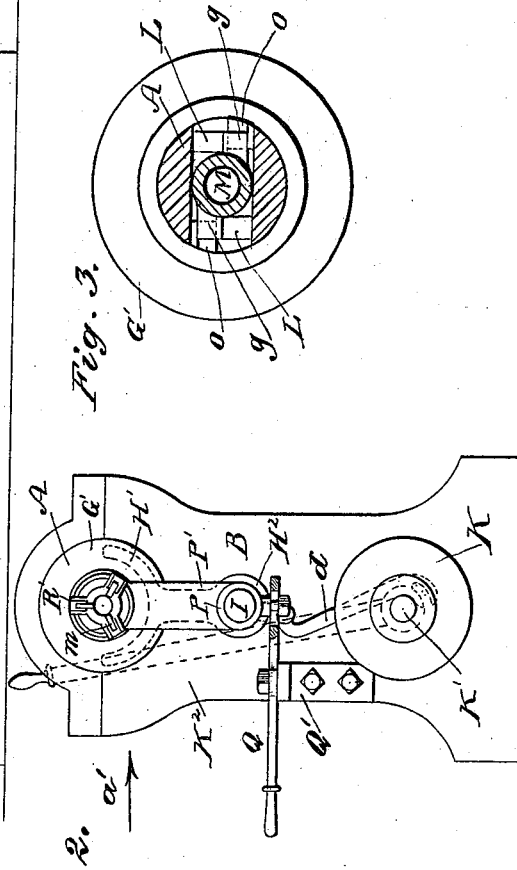
WITNESSES:
INVENTOR:
A. T. Booth
BY
ATTORNEYS.

United States Patent Office.

ALBERT T. BOOTH, OF MERIDEN, CONNECTICUT.

TURNING-MACHINE.

SPECIFICATION forming part of Letters Patent No. 300,943, dated June 24, 1884.

Application filed November 26, 1883. (No model.)

*To all whom it may concern:*

Be it known that I, ALBERT T. BOOTH, of Meriden, in the county of New Haven and State of Connecticut, have invented a new and Improved Turning-Machine, of which the following is a full, clear, and exact description.

The object of my invention is to provide a new and improved machine for turning metal or wood.

The invention consists in a sliding tube contained in a revolving tube, which revolving tube carries a nipple on the end, which nipple contains a chuck fixed on the end of the sliding tube. The sliding tube is provided on its inner end with bevel projections adapted to be acted on by projections on a rotatable tubular plug adapted to be acted on by sliding strips held on a sleeve in the revolving tube.

The invention also consists in parts and details, as will be fully set forth hereinafter.

Reference is to be had to the accompanying drawings, forming part of this specification, in which similar letters of reference indicate corresponding parts in all the figures.

Figure 1 is a longitudinal elevation of my improved turning-machine, parts being broken away and others shown in section. Fig. 2 is an end view of the same, parts being broken out and others shown in section. Fig. 3 is an enlarged detail cross-sectional elevation of the same on the line $x\ x$, Fig. 1.

A tube, A, is journaled in standards B, and on the said tube a cone-pulley, C, or any other belt-pulley is mounted. On one end of the tube A a nipple, D, is held, which surrounds a spring-chuck, E, formed on the end of a tube, F, adapted to slide longitudinally within the tube A, which chuck is opened automatically by its spring, and is closed if the tube F is moved in the direction toward the end of the nipple, as thereby the ends of the prongs of the chuck will slide along the inner surface of the nipple, and will thus be brought together. A sleeve, G, provided with a peripherically - grooved collar, G', is mounted to slide on the tube A, into the groove of which collar G' a fork, H', projects, which is formed on the upper end of an arm, H, projecting upward from a sleeve, H², held to turn and slide on a sleeve, J', mounted to turn on an arm, I, projecting from the end of the machine-frame.

The sleeve H² is provided with an internally-threaded tubular projection, I', in which a screw, J, is held, the inner end of which passes into a helical groove, $a$, in the sleeve J', which sleeve is provided at one end with an arm, $b$, connected by a connecting-rod, $d$, with a disk, K', mounted on one end of a longitudinal shaft, K, journaled in the machine-frame, and provided at the opposite end with a handle-lever, K², for turning or throwing it. The tube F is provided at its inner end with two diametrically-opposite beveled blocks, L, adjoining which a tubular plug, M, is held loosely in the tube A, which plug is provided with two diametrically-opposite projections, $g$, on its side surface, which projections are adapted to engage with the beveled edges of the blocks L. A tubular screw, N, is screwed into the rear end of the tube A, and is used to adjust the plug M and to hold it in the desired position. Two strips, O, are held edgewise in longitudinal grooves in the tube F, and are connected with the sliding sleeve G. The strips or rules O each have one end beveled, the said beveled ends passing under the blocks L. A sleeve, P, is held to slide on the outer end of the arm I, and is connected with a lever, Q, for moving it in the direction of its length on the said arm I. The sleeve P is provided with an upwardly-projecting arm, P', in the upper end of which an externally-threaded piece of tubing, R, is held, the central axis of which is on line with the longitudinal axis of the tube F. At its outer end the tube R is provided with three pairs of jaws, R', in each of which a lever, S, is pivoted, which levers each have a roller, $m$, pivoted in the outer or projecting end. The inner ends of the levers S rest on a tapered nut, T, screwed on the tube R. On each lever S a spring, $t$, is screwed, which rests on the edge of the corresponding roller, $m$, and prevents the roller from revolving when the tube R is moved in the inverse direction of the arrow $b'$, but permits the roller to revolve when the tube R is moved in the direction of the arrow $b'$.

The operation is as follows: If an article to be turned is to be held by the chuck E, the lever K² is thrown in the direction of the arrow $a'$, Fig. 2, whereby the connecting-rod $d$ will be thrown outward, and will turn the sleeve J', whereby the edge of the slot $a$ acts on the pin J, and thus moves the sleeve H² in the direction of the arrow $b'$, whereby the sleeve G will be moved in a like direction, as will also the strips or bars O, connected with the said sleeve G. The beveled ends of the strips or bars O act on the projections $g$ of the plug M, and turn the said plug. The projections $g$ strike the beveled edges of the projections L on the inner or rear end of the tube F, and thus press the tube F in the inverse direction of the arrow $b'$. The prongs of the chuck E are then pressed together by the nipple D, and grasp and hold the article to be turned. If the sleeve G is withdrawn, the springs of the chuck throw the tube F back in the direction of the arrow $b'$, and the chuck is opened and the article released. By turning the beveled sleeve T in one direction or the other, it is screwed from or toward the jaws R', and will spread the inner ends of the levers S more or less, thereby pressing the outer ends, carrying the rollers $m$ toward each other more or less. The levers S are adjusted by means of the sleeve T in such a manner that their rollers $m$ will grasp a rod or wire that may be passed between them. By means of the lever Q the tube R is moved in the direction of the arrow $b'$, and the rollers $m$ slide on the wire; but if the tube R is moved in the inverse direction of the arrow $b'$ the rollers $m$ grasp the wire and move it in the inverse direction of the arrow $b'$. The lever Q is pivoted on a bracket Q', made fast to the machine-frame.

Having thus described my invention, I claim as new and desire to secure by Letters Patent—

1. In a turning-machine, the combination, with a revolving tube, of a sliding tube held in the same, a chuck on the outer end of the tube, bevel projections on the inner end of the tube, a rotatable plug provided with projections adapted to act on the bevel projections on the inner end of the sliding tube, and of means for turning the rotatable plug to raise its projections to act on the bevel projections on the inner end of the sliding tube, substantially as herein shown and described.

2. In a turning-machine, the combination, with a revolving tube, of a sliding tube held in the same, and provided at its outer end with a spring-chuck, beveled projections on the inner end of the sliding tube, a rotatable plug provided with projections adapted to act on the bevel projections on the inner end of the sliding tube, a sliding sleeve mounted on the revolving outer tube, and of sliding beveled strips held in slots of the sliding tube, and connected with the sleeve on the outer revolving tube, substantially as herein shown and described.

3. In a turning-machine, the combination, with the revolving tube A, provided with a nipple, D, of the sliding tube F, held in the tube A, and provided with a spring-chuck, E, the bevel projections L on the inner end of the tube F, the tubular plug M, having projections $g$, the adjusting-screw N, and means for turning the plug M, substantially as shown and described.

4. In a turning-machine, the combination, with the revolving tube A, having a nipple, D, on its end, of the sliding tube F, provided with a chuck, the sliding sleeve G, the bevel projections L on the inner end of the tube F, the tubular plug M, having projections $g$, and the sliding strips O, held in grooves in the tube F, and having beveled ends, which strips are secured to the sleeve G, substantially as herein shown and described.

5. In a turning-machine, the combination, with the tubes A and F, of the sleeve G, adapted to slide on the tube A, and adapted to operate means for moving the sliding tube F in the direction of its length, the sleeve H², provided with a pin, J, and mounted to slide on a sleeve, J', mounted to turn on an arm, I, and provided with a helical slot for receiving the end of the pin J, and of means for turning the sleeve J', substantially as herein shown and described.

6. In a turning-machine, the combination, with the tubes A and F, of the sleeve G, mechanism for moving the tube F longitudinally from the sleeve G, the sleeve H², having a forked arm, H, acting on the sleeve G, and provided with a pin, J, the sleeve J', having a helical groove, $a$, the connecting-rod $d$, the shaft K, and the lever K², substantially as shown and described.

7. In a turning-machine, the combination, with the tube-section R, of the levers S, pivoted to the same, the rollers $m$, pivoted in the outer ends of the levers, and the beveled ring T, held adjustably on the tube R, substantially as herein shown and described.

8. In a turning-machine, the combination, with the tube R, of the levers S, pivoted to the tube, the rollers $m$, pivoted on the outer ends of the levers S, the springs $t$, secured to the levers S, and acting on the rollers $m$, and of the adjustable beveled ring T, mounted on the tube R, substantially as herein shown and described.

ALBERT T. BOOTH.

Witnesses:
   JOSEPH H. WILLIAMS,
   JOHN Q. THAYER.